US011136185B2

(12) United States Patent
Southworth

(10) Patent No.: US 11,136,185 B2
(45) Date of Patent: *Oct. 5, 2021

(54) SECONDARY CONTAINMENT

(71) Applicant: Allied Steel, Lewistown, MT (US)

(72) Inventor: Patrick Southworth, Lewistown, MT (US)

(73) Assignee: Allied Steel, Lewistown, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/106,667

(22) Filed: Aug. 21, 2018

(65) Prior Publication Data

US 2018/0354715 A1    Dec. 13, 2018

Related U.S. Application Data

(63) Continuation of application No. 14/050,152, filed on Oct. 9, 2013, now Pat. No. 10,081,487.

(Continued)

(51) Int. Cl.
*B65D 90/08* (2006.01)
*E02D 5/76* (2006.01)
*E02D 5/80* (2006.01)
*E04H 17/16* (2006.01)
*E04H 17/22* (2006.01)

(Continued)

(52) U.S. Cl.
CPC ............... *B65D 90/24* (2013.01); *B09B 1/00* (2013.01); *B65D 90/046* (2013.01); *B65D 90/08* (2013.01); *E02B 7/02* (2013.01); *E02D 5/14* (2013.01); *E02D 5/24* (2013.01); *E02D 5/54* (2013.01); *E02D 5/76* (2013.01); *E02D 5/765* (2013.01); *E02D 5/80* (2013.01); *E02D 27/42* (2013.01); *E04H 7/02* (2013.01); *E04H 17/168* (2013.01); *E04H 17/22* (2013.01); *E04H 12/2215* (2013.01)

(58) Field of Classification Search
CPC ..... Y10T 403/7092; B65D 90/08; E02D 5/14; E02D 5/24; E02D 5/54; E02D 5/765; E02D 5/80; E04H 17/168; E04H 17/22
See application file for complete search history.

(56) References Cited

U.S. PATENT DOCUMENTS

| 60,889 A | 1/1867 | Haviland |
| 122,947 A | 1/1872 | Hopgood |

(Continued)

FOREIGN PATENT DOCUMENTS

FR           2331658 A1 *  6/1977   ............... B65G 3/02

OTHER PUBLICATIONS

Preliminary Amendment dated Oct. 26, 2016 from U.S. Appl. No. 15/299,320, 8 pages.

(Continued)

*Primary Examiner* — Tara Mayo-Pinnock
(74) *Attorney, Agent, or Firm* — Rainier Patents, P.S.; Paul W. Mitchell

(57) ABSTRACT

This patent pertains to secondary containment systems. One implementation includes a support assembly that includes an elongate post member and a stabilization plate. In one instance, a stabilization plate is mounted on the elongate post member to reduce movement of the elongate post member when the stabilization plate is embedded in the ground. Another implementation includes a panel splice assembly including reinforcing members that secure overlapping, corrugated panels.

11 Claims, 9 Drawing Sheets

Related U.S. Application Data

(60) Provisional application No. 61/766,059, filed on Feb. 18, 2013, provisional application No. 61/752,878, filed on Jan. 15, 2013, provisional application No. 61/736,449, filed on Dec. 12, 2012, provisional application No. 61/712,689, filed on Oct. 11, 2012.

(51) Int. Cl.
| | |
|---|---|
| *B65D 90/24* | (2006.01) |
| *E02B 7/02* | (2006.01) |
| *E02D 27/42* | (2006.01) |
| *B09B 1/00* | (2006.01) |
| *B65D 90/04* | (2006.01) |
| *E04H 7/02* | (2006.01) |
| *E02D 5/14* | (2006.01) |
| *E02D 5/24* | (2006.01) |
| *E02D 5/54* | (2006.01) |
| *E04H 12/22* | (2006.01) |

(56) References Cited

U.S. PATENT DOCUMENTS

| | | | |
|---|---|---|---|
| 235,709 A | 12/1879 | Smith et al. | |
| 249,803 A | 11/1881 | Sparks | |
| 575,374 A | 1/1897 | Reck | |
| 606,558 A | 6/1898 | Ketchum | |
| 700,077 A | 5/1902 | Peebles | |
| 850,497 A | 4/1907 | Schuchart | |
| 950,928 A * | 3/1910 | Lana | E01F 5/005 |
| | | | 405/125 |
| 1,166,563 A * | 1/1916 | Wemlinger | E02D 5/04 |
| | | | 405/276 |
| 1,181,938 A | 5/1916 | Stokes | |
| 1,214,679 A | 2/1917 | Hindmarsh | |
| 1,427,166 A * | 8/1922 | Parton | B65D 90/08 |
| | | | 220/4.16 |
| 1,764,207 A | 6/1930 | Johnson | |
| 2,018,920 A * | 10/1935 | Mette | E02D 29/02 |
| | | | 405/284 |
| 2,249,818 A * | 7/1941 | Gifford | E02D 5/08 |
| | | | 405/276 |
| 2,382,208 A | 8/1945 | Corbin | |
| 2,552,745 A | 5/1951 | Stanley et al. | |
| 3,074,674 A | 1/1963 | Hill | |
| 3,132,726 A | 5/1964 | Johnson | |
| 3,143,817 A | 8/1964 | Paulson | |
| 3,198,465 A | 8/1965 | Sutton | |
| 3,228,495 A * | 1/1966 | Hazell | E02D 5/08 |
| | | | 403/380 |
| 3,775,924 A | 12/1973 | McClure, Jr. | |
| 3,820,295 A * | 6/1974 | Folley | E04B 1/08 |
| | | | 52/270 |
| 4,099,359 A * | 7/1978 | Sivachenko | E01D 19/125 |
| | | | 405/284 |
| 4,211,504 A | 7/1980 | Schelfhorst | |
| 4,220,423 A * | 9/1980 | Sivachenko | E04B 7/08 |
| | | | 405/272 |
| 4,756,033 A | 7/1988 | Schelfhorst | |
| 4,864,467 A | 9/1989 | Byrd et al. | |
| 4,917,543 A * | 4/1990 | Cole et al. | E02D 5/04 |
| | | | 256/73 |
| 5,175,966 A | 1/1993 | Remke et al. | |
| 5,182,889 A | 2/1993 | Johnson | |
| 5,253,959 A * | 10/1993 | MacDonald et al. | E01D 2/00 |
| | | | 405/279 |
| 5,326,191 A * | 7/1994 | Wilson et al. | E01F 5/005 |
| | | | 285/903 |
| 5,613,329 A | 3/1997 | Land et al. | |
| 6,213,314 B1 | 4/2001 | Beemer | |
| 7,090,440 B1 | 8/2006 | Short | |
| 7,172,163 B1 | 2/2007 | Johnson | |
| 8,858,120 B2 * | 10/2014 | Allen et al. | E02D 27/01 |
| | | | 405/107 |
| 2002/0067959 A1 | 6/2002 | Thornton | |
| 2002/0088186 A1 | 7/2002 | Cusimano et al. | |
| 2008/0219796 A1 * | 9/2008 | Yurgevic | B62D 33/04 |
| | | | 410/115 |
| 2014/0105686 A1 | 4/2014 | Southworth | |
| 2014/0105687 A1 | 4/2014 | Southworth | |
| 2017/0036858 A1 | 2/2017 | Southworth | |
| 2017/0284118 A1 | 10/2017 | Southworth | |

OTHER PUBLICATIONS

Non-Final Office Action dated Jan. 12, 2017 from U.S. Appl. No. 15/299,320, 17 pages.
Response dated Mar. 17, 2017 from U.S. Appl. No. 15/299,320, 11 pages.
Notice of Allowance dated Mar. 27, 2017 from U.S. Appl. No. 15/299,320, 5 pages.
Preliminary Amendment dated Jul. 18, 2017 from U.S. Appl. No. 15/631,980, 8 pages.
Restriction Requirement dated Nov. 3, 2017 from U.S. Appl. No. 15/631,980, 4 pages.
Response to Restriction Requirement dated Jan. 29, 2018 from U.S. Appl. No. 15/631,980, 7 pages.
Non-Final Office Action dated Mar. 15, 2018 from U.S. Appl. No. 15/631,980, 9 pages.
Notice of Allowance dated Sep. 7, 2016 from U.S. Appl. No. 14/050,238, 8 pages.
Response dated Aug. 24, 2016 to the Non-Final Office Action dated Jul. 29, 2016 from U.S. Appl. No. 14/050,238, 11 pages.
Restriction Requirement dated Feb. 5, 2016 from U.S. Appl. No. 14/050,238, 8 pages.
Response dated Mar. 18, 2016 to the Restriction Requirement dated Feb. 5, 2016 from U.S. Appl. No. 14/050,238, 9 pages.
Non-Final Office Action dated Jul. 29, 2016 from U.S. Appl. No. 14/050,238, 28 pages.
Southworth, Patrick, U.S. Appl. No. 61/712,689, filed Oct. 11, 2012, entitled "Secondary Containment," 16 pages.
Southworth, Patrick, U.S. Appl. No. 61/736,449, filed Dec. 12, 2012, entitled "Secondary Containment," 25 pages.
Southworth, Patrick, U.S. Appl. No. 61/752,878, filed Jan. 15, 2013, entitled "Secondary Containment," 38 pages.
Southworth, Patrick, U.S. Appl. No. 61/766,059, filed Feb. 18, 2013, entitled "Secondary containment," 40 pages.
Non-Final Office Action dated Feb. 6, 2015 from U.S. Appl. No. 14/050,152, 13 pages.
Response dated Jun. 5, 2015 to Non-Final Office Action dated Feb. 6, 2015 from U.S. Appl. No. 14/050,152, 13 pages.
Final Office Action dated Aug. 17, 2015 from U.S. Appl. No. 14/050,152, 10 pages.
Applicant-Initiated interview Summary dated Nov. 25, 2015 from U.S. Appl. No. 14/050,152, 3 pages.
After Final Consideration Program Request and Response dated Nov. 30, 2015 to the Final Office Action dated Aug. 17, 2015 from U.S. Appl. No. 14/050,152, 16 pages.
Response dated Dec. 17, 2015 to the Final Office Action dated Aug. 17, 2015 from U.S. Appl. No. 14/050,152, 14 pages.
Advisory Action, Examiner-Initiated Interview Summary, and After Final Consideration Program Decision dated Dec. 22, 2015 from U.S. Appl. No. 14/050,152, 6 pages.
Non-Final Office Action dated Mar. 11, 2016 from U.S. Appl. No. 14/050,152, 13 pages.
Response dated Aug. 9, 2016 to the Non-Final Office Action dated Mar. 11, 2016 from U.S. Appl. No. 14/050,152, 15 pages.
Final Office Action dated Oct. 26, 2016 from U.S. Appl. No. 14/050,152, 21 pages.
Appeal Brief filed Jun. 19, 2017 from U.S. Appl. No. 14/050,152, 30 pages.
Non-Final dated Oct. 18, 2017 from U.S. Appl. No. 14/050,152, 7 pages.
Response dated Nov. 29, 2017 from U.S. Appl. No. 14/050,152, 12 pages.
Final Office Action dated Jan. 12, 2018 from U.S. Appl. No. 14/050,152, 7 pages.

(56) References Cited

OTHER PUBLICATIONS

Terminal Disclaimer filed Jan. 12, 2018 from U.S. Appl. No. 14/050,152, 3 pages.
Response dated Jan. 29, 2018 from U.S. Appl. No. 14/050,152, 10 pages.
Notice of Allowance dated Feb. 9, 2018 from U.S. Appl. No. 14/050,152, 5 pages.
Terminal Disclaimer filed Mar. 20, 2018 from U.S. Appl. No. 14/050,152, 3 pages.
Notice of Allowance dated May 23, 2018 from U.S. Appl. No. 14/050,152, 5 pages.

* cited by examiner

SECONDARY CONTAINMENT

PRIORITY

This application is a continuation application of utility application Ser. No. 14/050,152 filed 2013 Oct. 9, which claims priority from provisional applications 61/712,689 filed 2012 Oct. 11, 61/736,449 filed 2012 Dec. 12, 61/752,878 filed 2013 Jan. 15, and 61/766,059 filed 2013 Feb. 18, which are incorporated by reference in their entirety.

BACKGROUND

In resource extraction, secondary containment systems are often desired to prevent environmental degradation in the event of an unintentional release of extracted material. The secondary containment system is set up around the extraction site as a barrier to contain the extracted material, such as oil. For example, the secondary containment system can prevent spilled oil from reaching a receiving water body or other area that might suffer environmental degradation from the spilled oil. Secondary containment systems should be effectively water-tight and able to stand up to the force applied by the released, extracted material against the barrier. Existing systems for anchoring and splicing together components of secondary containment systems can require a large amount of materials and installation time to produce effective spill containment. To properly support sidewalls of secondary containment systems, typically posts are anchored with concrete set in the ground. Due to the inadequate structural support of typical concrete footings used with the posts, a close spacing of posts must be used along the barrier sidewalls, thereby requiring a significant amount of materials. In addition, the large number of concrete footings at the posts can take a significant amount of installation time. The sidewalls are typically made with overlapping barrier panels of corrugated steel that are spliced together with a gasket between overlapping panels. For the secondary containment system to be effectively water-tight, in case an inner liner of the system is punctured or otherwise fails, a large number of bolts are typically used to produce sufficient pressure on the overlapping panels against the gasket. The large number of bolts can require significant installation time.

SUMMARY

This patent pertains to secondary containment systems. One implementation is a support assembly for a secondary containment system including at least one stabilization plate. Another implementation includes first and second stabilization plates mounted on opposite sides of an elongate post member of a support assembly. A further implementation is a splice assembly including a pair of elongate reinforcing members with inwardly facing surfaces that have a corrugation pattern, for securing on either side of a pair of overlapping corrugated panels.

The above listed examples are provided for introductory purposes and do not include all of, and/or limit, the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

The present description relates to secondary containment systems for containing a material, such as a liquid. For example, secondary containment systems can be utilized during resource extraction operations to contain spilled drilling materials and/or extracted materials. As used herein, "secondary containment" is intended to be given a broad definition to include any type of barrier, such as a liquid barrier, a barrier for another material, or an assembly of components that may serve as a barrier or may serve another purpose.

The described implementations can address containment issues. As mentioned above, containment issues can include a need for a secondary containment system to be water-tight (e.g., fluid-tight) and a need for a secondary containment system to resist a force of material against it. Containment issues can also include a need to hold or splice together components of a system that may contain a material. Specific structures for accomplishing the containment are described in more detail below relative to FIGS. 1 through 9C.

Viewed another way, the described implementations offer the capacity to contain materials, create a barrier, and/or otherwise support or connect corrugated panels. The described implementations offer reduced material needs, improved structural support, and reduced installation time for secondary containment systems. The present concepts can be applied in other fields, such as fields where a barrier is needed to contain a material or corrugated sheets are spliced together, for example snow fences, grain elevators, or culverts.

EXAMPLES

Figure 1:
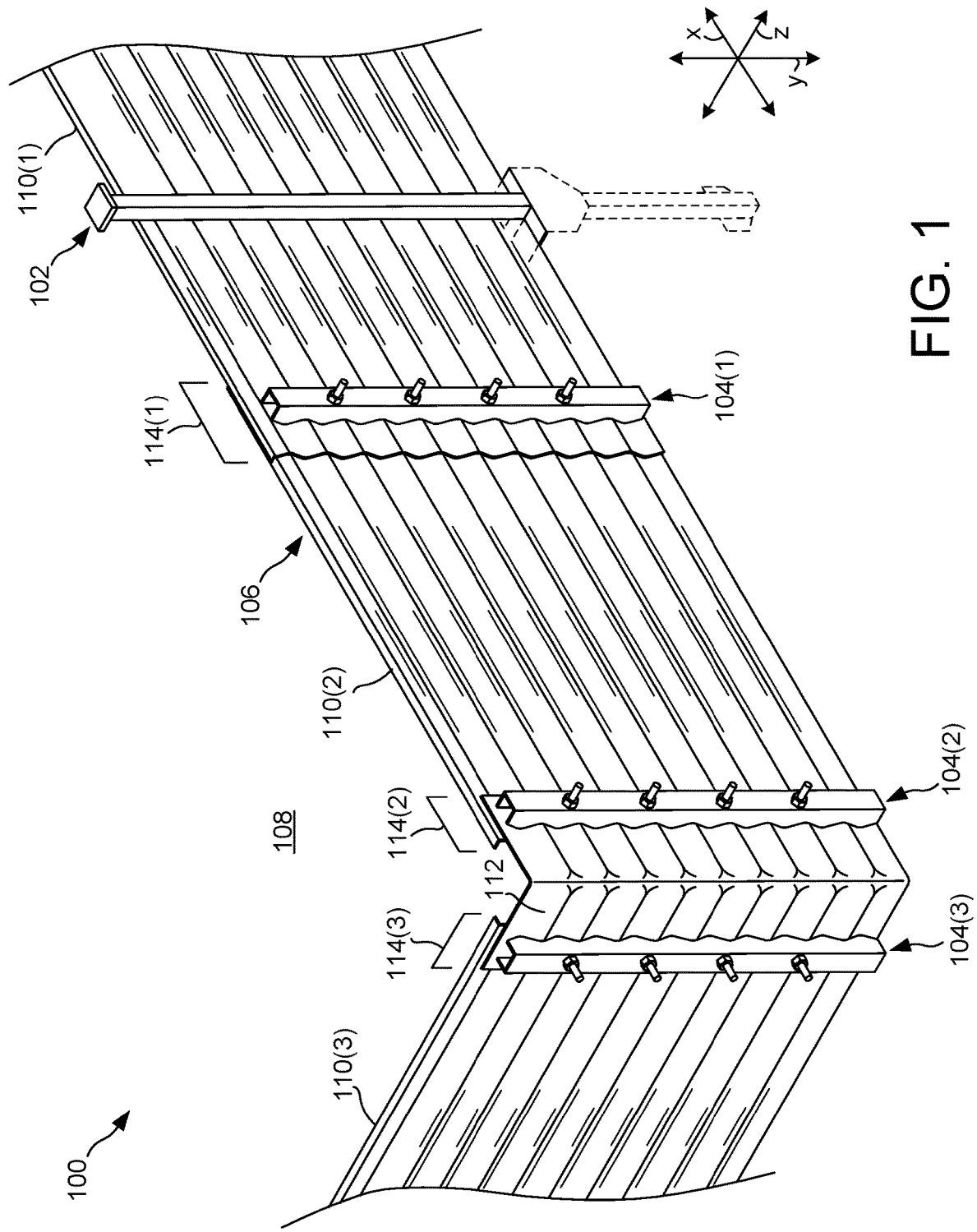
FIG. 1 is a perspective view of a section of a secondary containment system that is consistent with containment concepts in accordance with some implementations.
Figure 2:
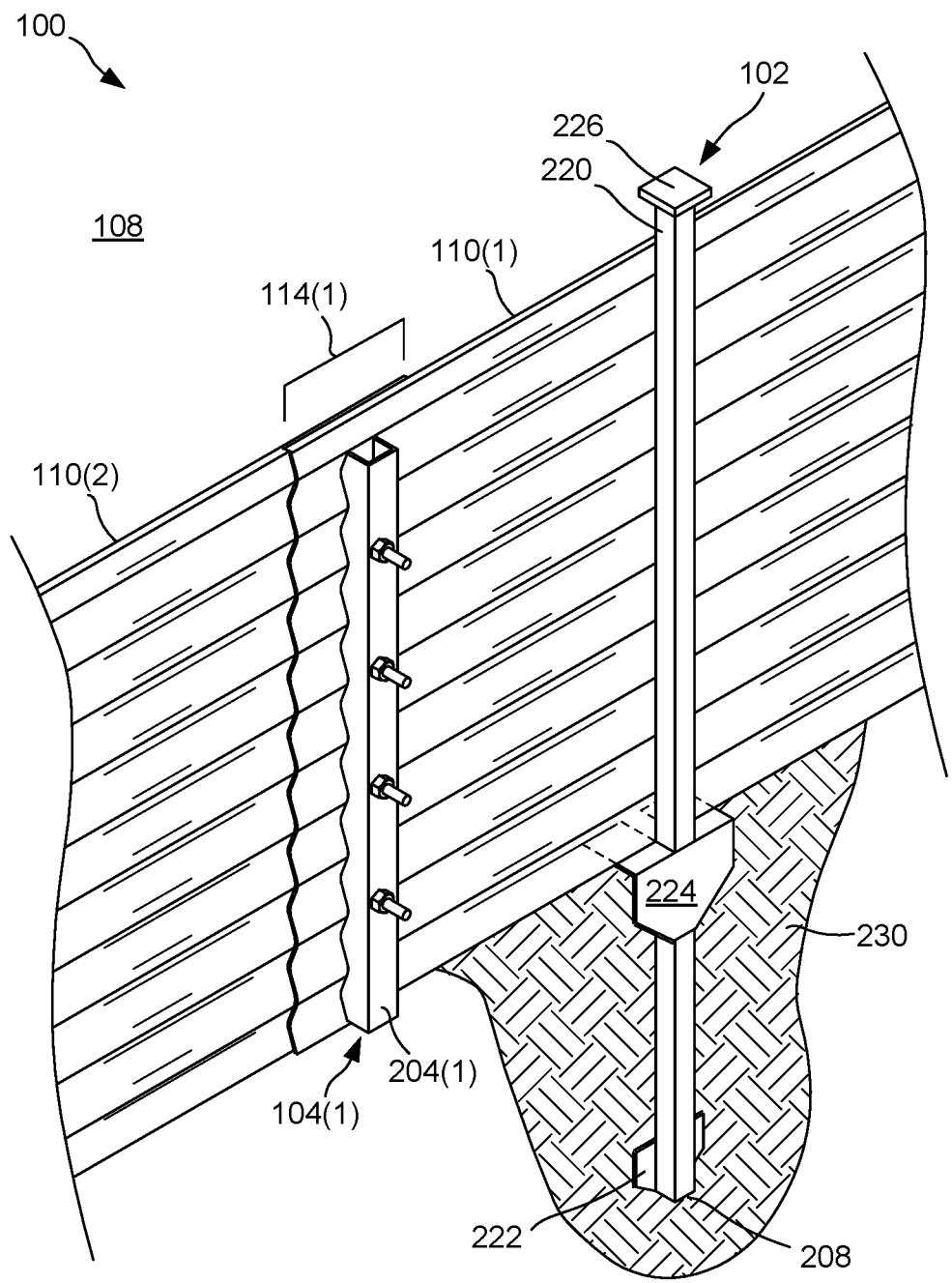
FIGS. 2 and 3 are perspective views of structures of a secondary containment system that are consistent with containment concepts in accordance with some implementations.
Figure 2:
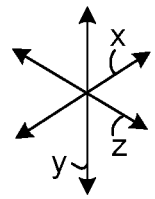
Figure 3:
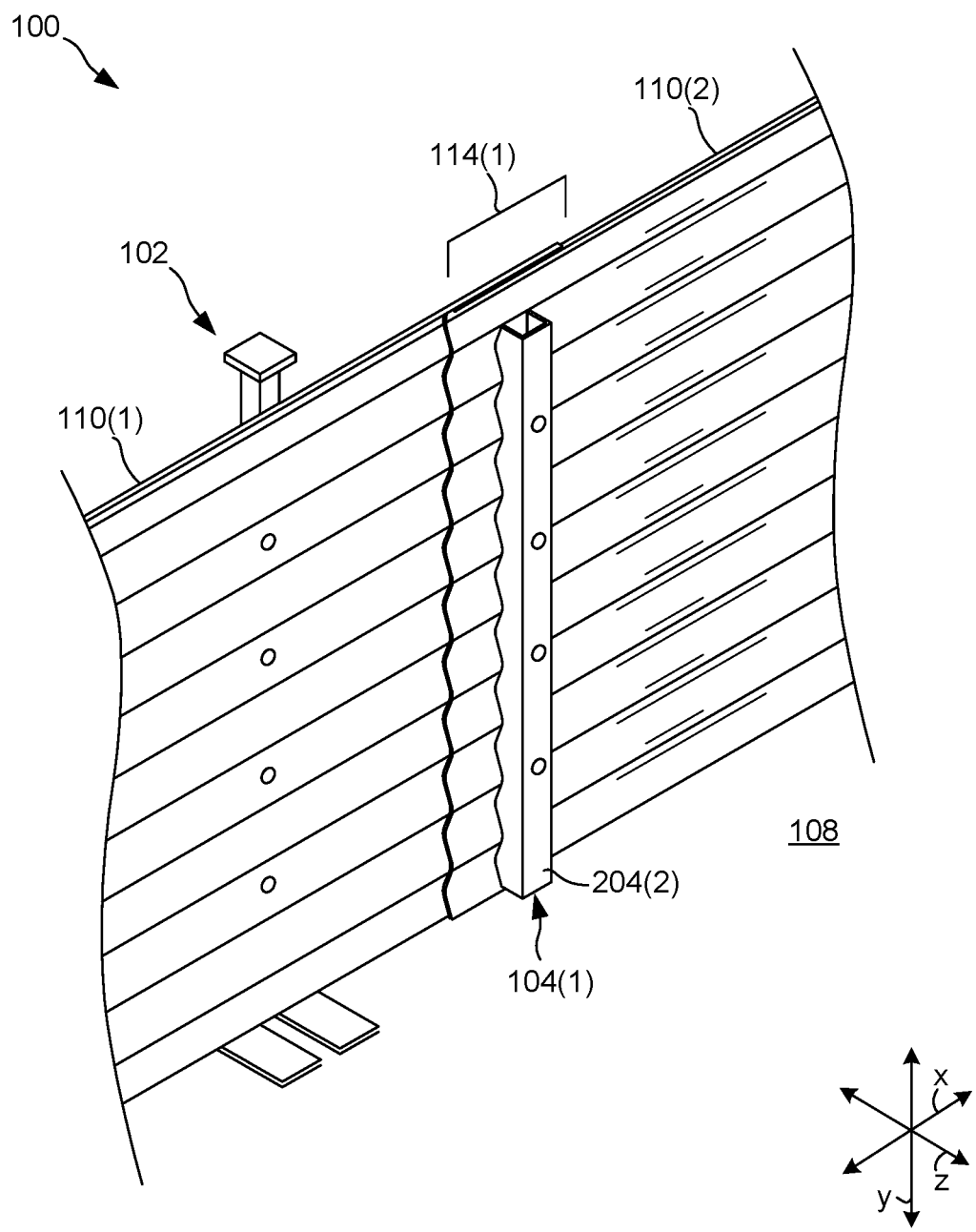
Figure 8A:
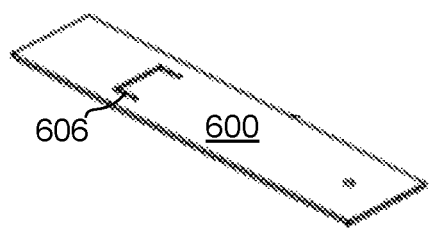
FIGS. 8A through 8D show perspective views of structures and methods for assembling an example support assembly.
Figure 8B:
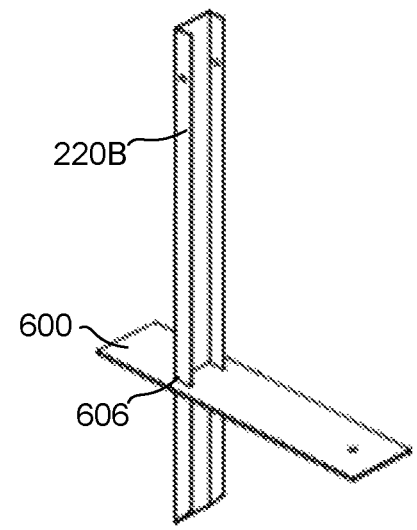
Figure 8C:
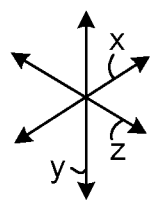
Figure 8C:
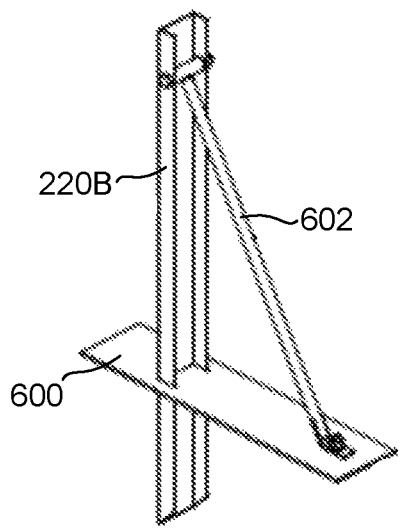
Figure 8D:
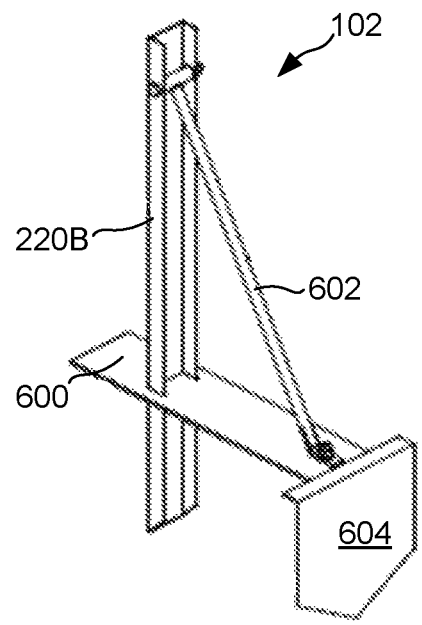
Figure 9A:
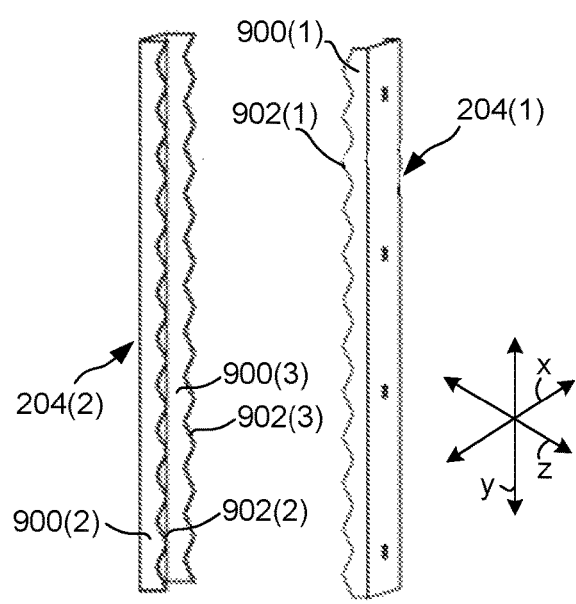
FIG. 9A is a perspective view and FIGS. 9B and 9C are sectional views of an example reinforcing assembly that is consistent with containment concepts in accordance with some implementations.
Figure 9B:
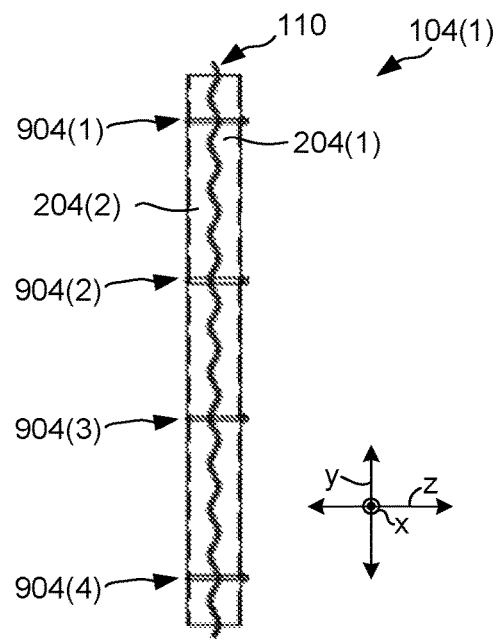
Figure 9C:
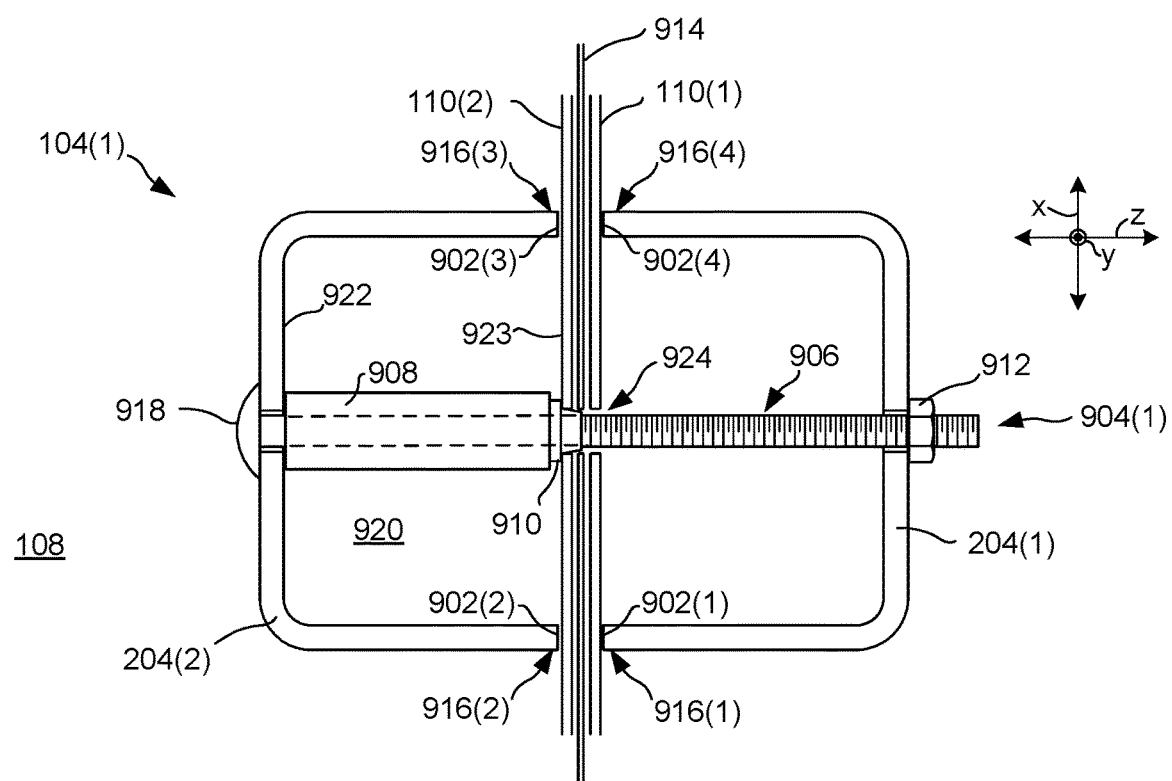

FIGS. 1 through 3 collectively illustrate an implementation of a secondary containment system 100. As shown in FIG. 1, one implementation of the secondary containment system 100 can include support assemblies 102 and splice assemblies 104 (e.g., panel splice assemblies, reinforcing assemblies). Note that different instances of the various elements in FIG. 1 are distinguished by parenthetical references, e.g., 104(1) refers to a different splice assembly than 104(2). When referring to multiple elements collectively, the parenthetical will not be used, e.g., splice assemblies 104 can refer to either or all of splice assembly 104(1), splice assembly 104(2), and splice assembly 104(3). FIGS. 4 through 8D collectively illustrate support assembly implementations. FIGS. 9A through 9C collectively illustrate splice assembly implementations.

Referring to FIG. 1, secondary containment system 100 can include multiple support assemblies 102 and splice assemblies 104. Due to the constraints of the drawing page, only a portion of the secondary containment system is shown. Also, the relative sizes and/or proportions of the elements shown in the Figure may not be to scale. The number and/or placement of support assemblies and splice assemblies shown in FIG. 1 is for illustration only and is not meant to be limiting. The number or placement of support assemblies and splice assemblies may vary based on many factors, such as overall dimensions utilized for the secondary containment system.

In one implementation, support assemblies 102 can be spaced apart to support a generally continuous barrier structure 106 that defines a perimeter (not shown) of secondary containment system 100. The secondary containment system can be configured to confine materials, such as spilled liquids, to an interior 108 of the perimeter. As shown in FIG. 1, barrier structure 106 can include multiple overlapping panels 110 (e.g., panels, barrier panels). The barrier structure may include other elements, such as corner sections 112. In FIG. 1, the interior 108 is generally in the background of the drawing, or behind the barrier structure. In this example, when secondary containment system 100 contains a material such as a liquid in the interior 108, the support assemblies can generally keep the secondary containment system in place, by preventing barrier structure 106 from tipping over, away from the interior, or by preventing the secondary containment system from otherwise failing from a force or pressure of the material being contained. In this respect failure can refer to any manner in which panels 110 or other elements of barrier structure 106 or secondary containment system 100 no longer contain a material or effectively resist a force or pressure, such as by tipping or bending. Failure does not necessarily refer to a catastrophic material or secondary containment system failure.

As shown in the example in FIG. 1, panels 110, corner sections 112, or other elements of barrier structure 106 can be connected by splice assemblies 104. Splice assemblies 104 can splice together overlapping sections 114 (e.g., overlap areas) of elements of barrier structure 106, such as panels 110 or corner sections 112. In FIG. 1, three instances of overlapping sections are shown. For example, overlapping section 114(1) is where a first overlapping panel 110(1) and a second overlapping panel 110(2) overlap and are connected by splice assembly 104(1). Overlapping section 114(2) is where panel 110(2) and corner section 112 overlap, connected by splice assembly 104(2). Overlapping section 114(3) is where panel 110(3) and corner section 112 overlap, connected by splice assembly 104(3).

FIGS. 2 and 3 collectively show closer views of some components of one implementation of secondary containment system 100. FIG. 2 shows an example of the secondary containment system with the interior 108 generally in the background of the drawing. FIG. 3 shows the drawing of FIG. 2 as seen from the opposite side, with the interior 108 generally in the foreground of the drawing.

In the example secondary containment system 100 shown in FIG. 2, support assembly 102 can include an elongate post member 220, a lower stabilization plate 222 (e.g., first stabilization plate), an upper stabilization plate 224 (e.g., second stabilization plate), and a cap 226. Elongate post member 220 can be embedded in the ground 230 proximate the perimeter (not shown) of secondary containment system 100. FIG. 2 includes a cutaway view of the ground 230 to show the elongate post member 220 embedded in the ground, where the ground is depicted with hash marks. In this example, panel 110(1) is secured against support assembly 102 on the interior 108 side of the support assembly. The various elements of support assembly 102 will be described in further detail below.

Also shown in FIG. 2 is splice assembly 104(1). In some implementations, splice assemblies 104 can include a pair of elongate reinforcing members 204. In FIG. 2, only a first individual elongate reinforcing member 204(1) of the pair is visible. FIG. 3 shows the opposing side of splice assembly 104(1), with the opposing reinforcing member 204(2) on the opposite side of overlapping section 114(1). (Both reinforcing members 204(1), 204(2) are evident in FIGS. 9A through 9C). The reinforcing members 204 can have a long axis that is generally parallel to the y axis of the x-y-z reference axes. The various elements of splice assemblies 104 will be described in further detail below relative to FIGS. 9A through 9C.

Figure 4:
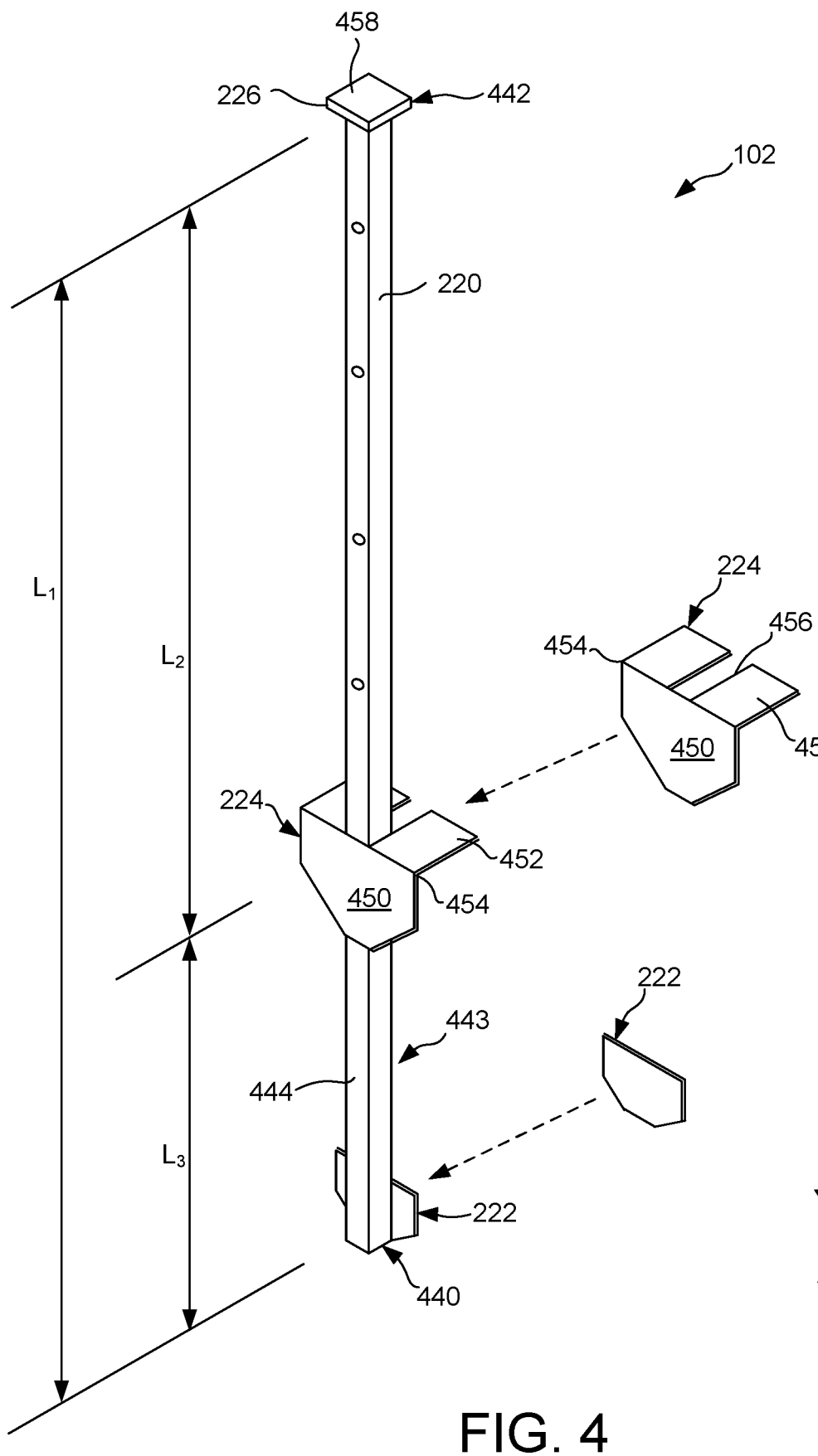
FIG. 4 is a perspective view showing an example support assembly that is consistent with containment concepts in accordance with some implementations.

Various details of support assembly 102 will now be described in more detail. FIG. 4 shows a closer, isolated view of example support assembly 102. In this case, elongate post member 220 can have an overall length $L_1$ from a bottom end 440 (e.g., first end) to a top end 442 (e.g., second, opposite end). The elongate post member can have an upper portion $L_2$ (e.g., length) and a lower portion $L_3$ (e.g., length). The elongate post member can also have a first major surface 443 (e.g., first side) and an opposing second major surface 444 (e.g., second side) that are generally parallel and generally planar with respect to the x and y axes of the x-y-z reference axes. In FIG. 4, the first major surface is not visible due to the perspective of the drawing, but is generally designated with an arrow at 443. The second major surface is visible and designated as 444. (Example first and second major surfaces are both evident in another implementation of the support assembly shown in FIG. 5.)

In some implementations, lower stabilization plate 222 can be secured against the first major surface 443 of elongate post member 220 proximate the bottom end 440 of the elongate post member. Upper stabilization plate 224 can be secured against the opposite side of the elongate post member, against the second major surface 444 of the elongate post member. In this case upper stabilization plate 224 can be positioned farther from the bottom end 440 than lower stabilization plate 222, but closer to the bottom end than the top end 442 of the elongate post member 220.

FIG. 4 shows exploded views of implementations of the lower stabilization plate 222 and the upper stabilization plate

224. As shown in the example in FIG. 4, the lower stabilization plate can be generally planar. When secured against the elongate post member 220, lower stabilization plate 222 can extend generally parallel to the first major surface 443, in the x and y directions of the x-y-z reference axes. The upper stabilization plate 224 can include a generally vertical portion 450 (e.g., first portion, first generally planar portion) and a generally horizontal portion 452 (e.g., second portion, second generally planar portion). The vertical portion 450 can extend generally parallel to the second major surface 444, in the x and y directions of the x-y-z reference axes. The shapes of the lower and upper stabilization plates shown in FIG. 4 are not meant to be limiting. Other shapes, dimensions, and/or proportions of the lower and upper stabilization plates are contemplated. In some implementations, an overall width of the vertical portion 450 can be greater than an overall height of the vertical portion, as shown but not designated in FIG. 4. In this example, the overall width of the vertical portion 450 is about 12 inches. Also in this example, the vertical portion of upper stabilization plate 224 and the lower stabilization plate 222 are mounted on opposite sides of elongate post member 220.

The vertical portion 450 of the upper stabilization plate 224 can have a top edge 454 (e.g., upper edge). In some implementations, when the upper stabilization plate is secured against the elongate post member 220, the top edge 454 of the vertical portion can be positioned against the elongate post member and generally extend along the x axis of the x-y-z reference axes. Viewed another way, the top edge 454 of the vertical portion can be positioned at a top edge of the lower portion $L_3$ of the elongate post member. In this case, the vertical portion of the upper stabilization plate can have a surface area generally parallel to the x-y plane of the x-y-z reference axes. The lower stabilization plate 222 can also have a surface area that is generally parallel to vertical portion 450.

In this implementation, the overall length $L_1$ of elongate post member 220 can be between 4 and 5 feet, and a length of the lower portion $L_3$ can be around 23 inches. Viewed another way, a proportion (e.g., ratio) of lengths of the upper portion $L_2$ of the elongate post member 220 to the lower portion $L_3$ can be in a range of about 1.5:1 to about 1:1. In this case, the proportion of the lengths of the upper portion $L_2$ to the lower portion $L_3$ can be around 1.25:1. The surface area of vertical portion 450 of upper stabilization plate 224 can be at least five times greater than the surface area of lower stabilization plate 222. For example, the surface area of the vertical portion can be around 60 square inches or greater, while the surface area of the lower stabilization plate can be around 12 square inches or less. As noted above, other dimensions and/or shapes for the elongate post member and lower and upper stabilization plates are contemplated, including the proportions of these elements relative to each other.

As shown in the example in FIG. 4, the horizontal portion 452 of the upper stabilization plate 224 can extend from the top edge 454 in the z direction of the x-y-z reference axes. The horizontal portion can be generally planar, and can have a slot 456 to accommodate the elongate post member 220, so that the horizontal portion extends around the elongate post member and past the first major surface 443. A width (not designated) of the elongate post member can be described as a distance in the z direction between the opposing first and second major surfaces 443, 444 of the elongate post member. In some implementations, the horizontal portion 452 can extend past the first major surface in the z direction by an amount that is equal to or greater than the width of the elongate post member.

Elongate post member 220 can be fabricated from various materials. For example, the elongate post member can be made from iron-based, aluminum-based, or other materials configured in the form of channel, bent plate, wide flange beam, tube steel (round or square)(e.g., hollow structural section), angle or pipe, or I-beam, among others. The example elongate post member 220 shown in FIG. 4 is made from two-inch square hollow structural section with ⅛-inch wall thickness (e.g., HSS 2×2×⅛). As another example, the elongate post member can be made from 12-gauge, two-inch square hollow structural section (e.g., HSS 2×2×12-gauge). Of course other structural materials and/or dimensions, including thicknesses, are contemplated. The material of the elongate post member can have rigidity to resist force, such as a force parallel to the ground that is applied to the post in a horizontal direction.

The elongate post member 220 can have a configuration that has one or more flat surfaces, such as square tube steel (as mentioned above). The square tube steel form can provide the first and second major surfaces 443, 444 as flat surfaces. A configuration that has at least one flat surface can make it an easier configuration to work with, such as for securing lower stabilization plate 222 and upper stabilization plate 224 to the elongate post member. For example, lower and upper stabilization plates can be welded to first and second major surfaces 443, 444. Additionally, if the elongate post member 220 includes a flat surface, it can be easier to grab, lift, or turn the elongate post member with a mechanical device, such as to position support assembly 102. Otherwise, if the elongate post member were made from rounded pipe, turning or positioning the support assembly, particularly with a mechanical device, could be more difficult or less precise. However, some implementations can employ round pipe or other configurations for the elongate post member. For example the elongate post member could be made from angle iron (as mentioned above), and at least one of the upper or lower stabilization plates could be welded to a flat surface of the angle iron (or across the angled surfaces) or affixed in another manner.

Lower stabilization plate 222 and upper stabilization plate 224 can be configured from various structural materials. For example, iron based or aluminum based materials in the form of plate or bent plate, among others, can be employed. As shown in the example in FIG. 4, 12-gauge metal plate can be cut in the shape of upper stabilization plate 224, then bent to form vertical portion 450 and horizontal portion 452. In FIG. 4, lower stabilization plate 222 is also formed from 12-gauge metal plate. In other implementations, the vertical portion and the horizontal portion could be made from two or more pieces that are welded together or otherwise connected.

As shown in FIG. 4, support assembly 102 can have a cap 226. The cap can have a horizontal surface 458 for receiving a downward vertical force for driving the support assembly into the ground. In this example, the cap 226 can prevent the elongate post member 220 from being distorted by the downward vertical force. The cap can be cut from ¼-inch thick metal plate. The cap can be wider than the top end 442 of the elongate post member as shown in FIG. 4, or can be sized to fit the top end of the elongate post member. The cap can be designed to fit into or be held by a device for driving the support assembly into the ground. Additionally, the cap could include a hook, loop, or other structure (not shown) for lifting the support assembly. Other structures or functions for the cap are contemplated consistent with the present containment concepts.

Various fasteners can be utilized to secure the elements of support assembly 102 to one another. Alternatively or additionally, welding or other techniques can be utilized to secure the elements together. For example, lower stabilization plate 222 and upper stabilization plate 224 can be attached to elongate post member 220 by welding, or by fasteners including bolts, threaded weld studs, and/or self driving screws or pins, among others. The lower and upper stabilization plates could be clamped to the elongate post member. In some implementations, the lower or upper stabilization plates could be embedded in the ground proximate the elongate post member without being attached to the elongate post member. The cap 226 could be welded or otherwise secured to the top end 442 of the elongate post member.

Figure 5:
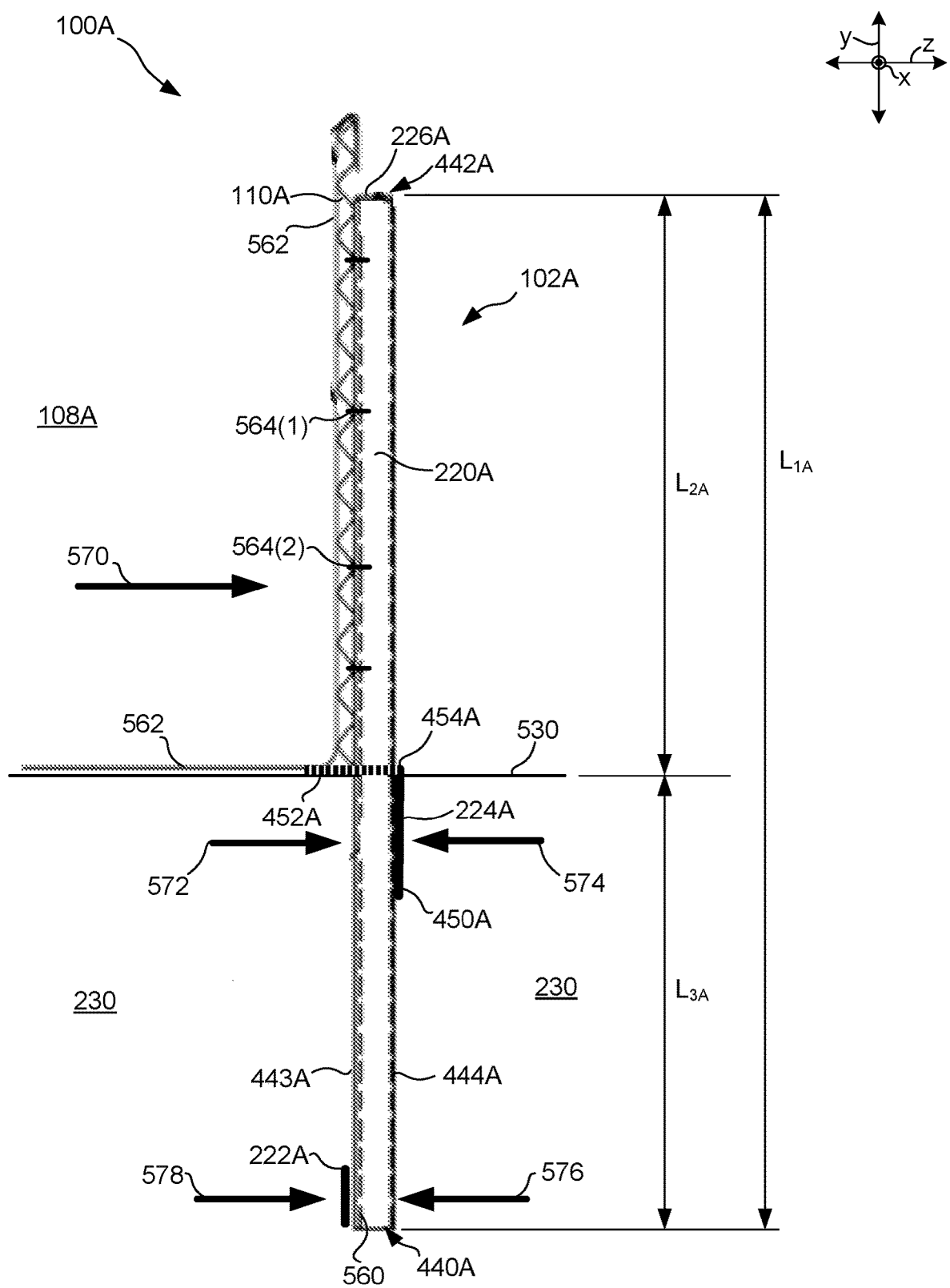
FIG. 5 is a sectional view showing an example support assembly in the context of a secondary containment system that is consistent with containment concepts in accordance with some implementations.

FIG. 5 shows a cross sectional view of another example of a support assembly 102A in the context of another implementation of a secondary containment system 100A. As noted above, like reference numbers in the various drawings are used wherever feasible to indicate like elements. For example, in secondary containment system 100A, support assembly 102A can include similar elements as support assembly 102, such as elongate post member 220A, lower stabilization plate 222A, upper stabilization plate 224A, and cap 226A. Some implementations of secondary containment systems 100, 100A or support assemblies 102, 102A may have minor dimensional or proportional differences in some like elements. For example, elongate post member 220A of support assembly 102A is shown in FIG. 5 as slightly shorter than panel 110A, as opposed to the elongate post member 220 of support assembly 102 of secondary containment system 100, as shown in FIGS. 1 through 3, which is taller than panel 110. Also, the cap 226 of support assembly 102 shown in FIG. 4 is wider than the cap 226A of support assembly 102A shown in FIG. 5. Note that in the example shown in FIG. 5, dashed lines 560 within elongate post member 220A illustrate inner surfaces of the square tube steel. In this example, the interior 108A side of secondary containment system 100A is against a first major surface 443A of the elongate post member.

Lower stabilization plate 222A is secured against the first major surface 443A of elongate post member 220A proximate bottom end 440A of the elongate post member such that the lower stabilization plate faces the interior 108A of secondary containment system 100A. Upper stabilization plate 224A is secured against second major surface 444A such that a vertical portion 450A of the upper stabilization plate faces away from the interior 108A of secondary containment system 100A. The upper stabilization plate 224A can be positioned such that the vertical portion 450A is embedded in the ground 230, generally near the ground surface 530.

In this implementation, elongate post member 220A can have an overall length $L_{1A}$ as measured from the bottom end 440A to top end 442A. The elongate post member can be embedded in the ground 230 such that an upper portion $L_{2A}$ (e.g., length) is above the ground surface 530 and a lower portion $L_{3A}$ (e.g., length) is below the ground surface. Similar to example elongate post member 220 (FIG. 4), the overall length $L_{1A}$ of the elongate post member 220A can be between 4 and 5 feet, and a length of the lower portion $L_{3A}$ embedded in the ground 230 can be around 23 inches, such that the proportion of lengths of the upper portion $L_{2A}$ to the lower portion $L_{3A}$ can be around 1.25:1. Other dimensions and/or proportions for the elongate post member are contemplated, including the portions intended to be embedded in the ground or left above the ground surface.

As noted above and shown in the example in FIG. 5, the vertical portion 450A of upper stabilization plate 224A can be embedded in the ground 230 such that the top edge 454A of the vertical portion is generally near the ground surface 530. A horizontal portion 452A of the upper stabilization plate can lie along the ground surface 530 (e.g., flush with the ground surface) when the vertical portion is embedded in the ground. (In FIG. 5 the horizontal portion 452A is depicted with a dashed line since the sectional view is through a slot in the horizontal portion, as shown and described relative to the example horizontal section in FIG. 4.) As discussed above relative to the example in FIG. 4 and also shown in the example in FIG. 5, the horizontal portion can extend from the top edge 454A of the vertical portion past elongate post member 220A toward the interior 108A of the secondary containment system 100A. Thus, the horizontal portion can support at least one panel 110A on the interior side of the elongate post member. Additionally shown in FIG. 5, some implementations of the secondary containment system 100A can include an inner liner 562 that can extend down the interior 108A side of panel 110A and continue toward the interior 108A along the ground surface 530. The liner 562 may or may not be attached to the panels 110A. The liner can be any type of plastic liner, spray-on liner, or other liner. The liner can be intended to make the secondary containment system effectively water-tight (e.g., fluid-tight).

Shown in FIG. 5, in some implementations panels 110A can be attached to support assemblies 102A with bolts 564. (Not all bolts 564 are shown to avoid clutter on the drawing page.) For example, panel 110A can be attached to first major surface 443A of elongate post member 220A with any number of bolts. In the example shown in FIG. 5, the heads of the bolts (not designated) are toward the interior side of the support assembly. (Note that heads of the bolts are shown but not designated in the example in FIG. 3.) In some implementations, holes for the bolts may be pre-drilled in the support assemblies (shown but not designated in the example in FIG. 4). Bolts are just one example of an attachment for the panel to the support assembly. Other methods of attaching these elements are contemplated, such as screws, pins, clamps, wire, zip ties, or other means. Alternatively or additionally, the panels can be placed proximate the support assemblies without attachment. The panels can be attached to or held by elements of the support assemblies, such as the horizontal portion 452A of the upper stabilization plate 224A.

FIG. 5 also shows forces that can be applied to support assembly 102A, which will be described in the following discussion. As used herein, "force" is intended to be given a broad definition to include any type of force, pressure, moment, or moment area of inertia, among others, that may be applied to elements of the various implementations of the secondary containment system. Forces, depicted as horizontal arrows in FIG. 5, are for illustration purposes only. The size or proportions of the arrows are not to scale, and do not imply a magnitude of forces or moments that can be applied to elements of the secondary containment system.

As shown in the example in FIG. 5, a force from within the secondary containment system 100A, distributed against the interior 108A of panel(s) 110A, can be approximated by a generally horizontal summary force 570. Summary force 570 can exert pressure on support assembly 102A at a certain height (not designated) from the ground surface 530. In this case, when force 570 is applied to the panel(s), elongate post member 220A can push against the vertical portion 450A of the upper stabilization plate 224A. In turn, the vertical portion pushes into the ground 230 away from the interior 108A of the secondary containment system, shown as force 572. Force 572 can cause a reaction force 574 (e.g., ground reaction force) of the ground pushing back against the upper stabilization plate. Additionally, when force 570 is applied and vertical portion 450A presses into the ground, the elongate post member could be pressured to tip over, or in other words rotate about an axis that is parallel to the x axis of the x-y-z reference axes and proximate to the ground surface 530 and/or the upper stabilization plate. In this manner the top end 442A of the elongate post member can be pressured to move away from the interior of the secondary containment system. Accordingly, the bottom end 440A of the elongate post member can be pressured to move toward the interior, and lower stabilization plate 222A can apply force 576 against the ground. In this case, force 576 can cause a reaction force 578 of the ground pushing back against the lower stabilization plate.

Viewed another way, in some implementations the vertical portion 450A of the upper stabilization plate 224A can be intended to reduce movement of the top end 442A of the elongate post member 220A away from the interior 108A of the secondary containment system 100A when the support assembly 102A is embedded in the ground 230 and force 570 is applied. The upper stabilization plate can give rigidness to elongate post member, and can effectively increase a surface area of the elongate post member against the ground 230. Similarly, the lower stabilization plate 222A can be designed to reduce movement of the bottom end 440A of the elongate post member toward the interior of the secondary containment system when force 570 is applied. The movement of any part of the elongate post member that the upper and lower stabilization plates are designed to resist can include rotation, translation, and/or a combination of rotation and translation.

An estimated magnitude of force 570 can be used to design elements of some implementations of secondary containment systems. Referring to the example illustrated in FIG. 5, dimensions (e.g., vertical surface area, size, shape, and/or proportions) of the lower and upper stabilization plates 222A, 224A can be estimated or calculated based on a need to stabilize the elongate post member 220A against force 570. In this case, secondary containment system 100A can be designed to contain a spill, such as an oil spill, in the interior 108A. A magnitude of force 570 can be estimated based on factors such as physical properties of the oil, depth of the oil, and spacing of the support assemblies 102A along the panels 110A. Factors such as the estimated magnitude of force 570 and the height of force 570 above the ground surface 530 could be used to estimate force 572 of the vertical portion against the ground 230. For reaction force 574 to be a generally equal and opposite force to force 572, thereby stabilizing the elongate post member, an estimated minimum surface area of the vertical portion could be calculated from the estimated magnitude of force 572 and other influencing factors, such as physical properties of the ground (e.g., soil stiffness, compaction). Similarly, an estimated minimum surface area of the lower stabilization plate can also be determined.

Figure 6:
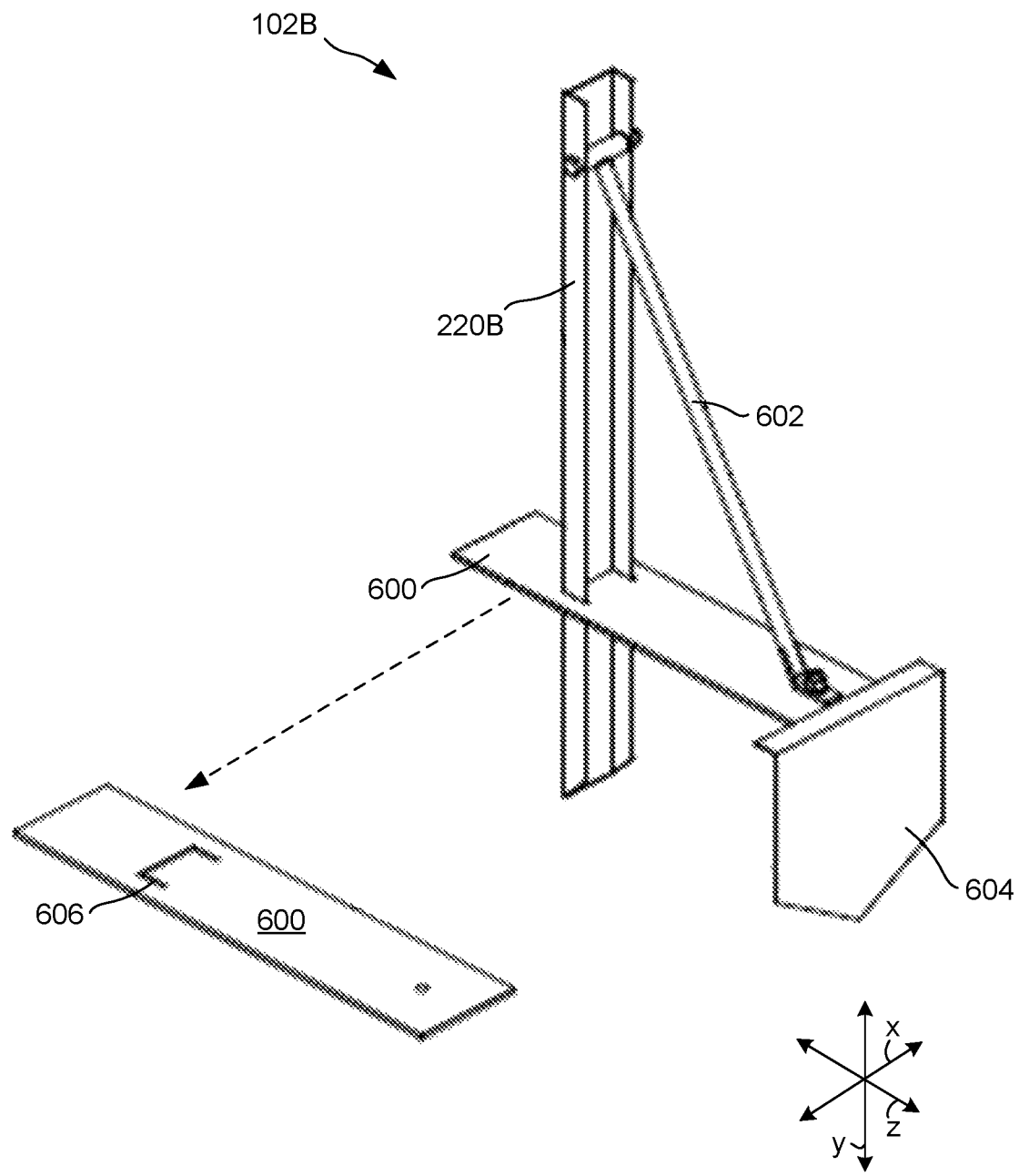
FIG. 6 is a perspective view showing another example of a support assembly in accordance with some implementations.

FIGS. 6 through 8D collectively illustrate an example of an alternative support assembly 102B. This example includes a base plate 600, elongate post member 220B, a brace 602, and a stabilization plate 604. FIG. 6 includes an exploded view of the base plate, which can include a cutout 606. The base plate can be formed from various structural materials, including iron based or aluminum based materials in the form of plate, bent plate, flat bar, or channel, among others. Elongate post member 220B can fit through cutout 606 in base plate 600. The cutout can be any shape that matches the shape of the elongate post member, or in other words receives the elongate post member. In this case elongate post member 220B is C-shaped channel and the cutout is a corresponding C-shape. In another example, the elongate post member can be square tube steel and the cutout could have a correspondingly sized square shape (not shown). Brace 602 can also be configured from various structural materials, such as iron based or aluminum based materials in the form of pipe or angle or tube steel, among others. Various fasteners can be utilized to secure the elements of support assembly 102B to one another. Alternatively or additionally, welding or other techniques can be utilized to secure the elements together.

Figure 7B:
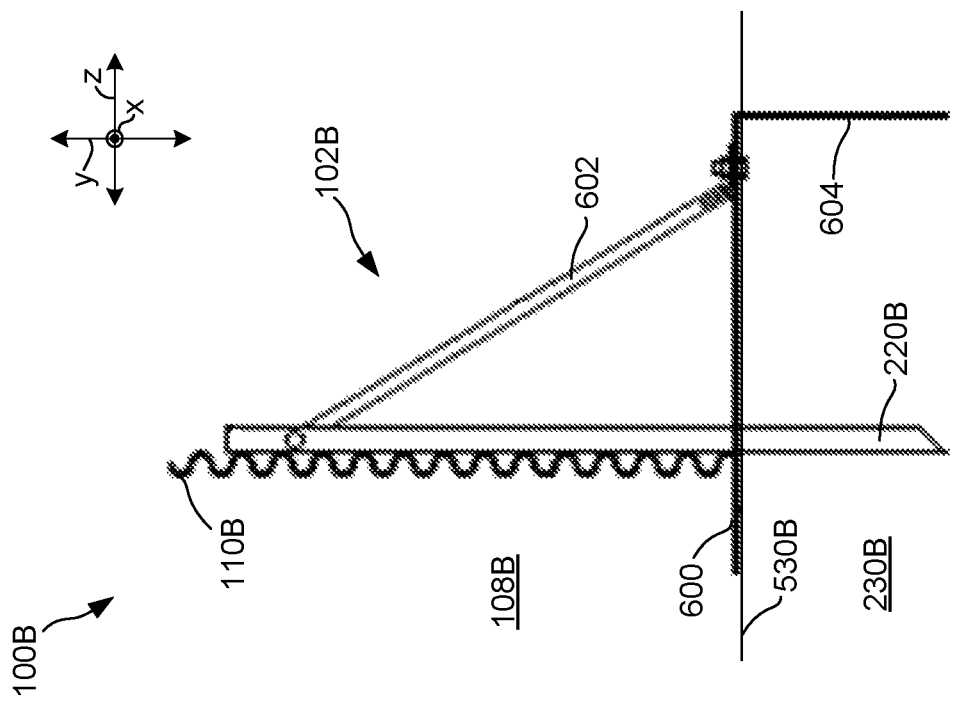
FIGS. 7A and 7B are a perspective and a sectional view showing another example of a support assembly in the context of a secondary containment system that are consistent with containment concepts in accordance with some implementations.
Figure 7A:
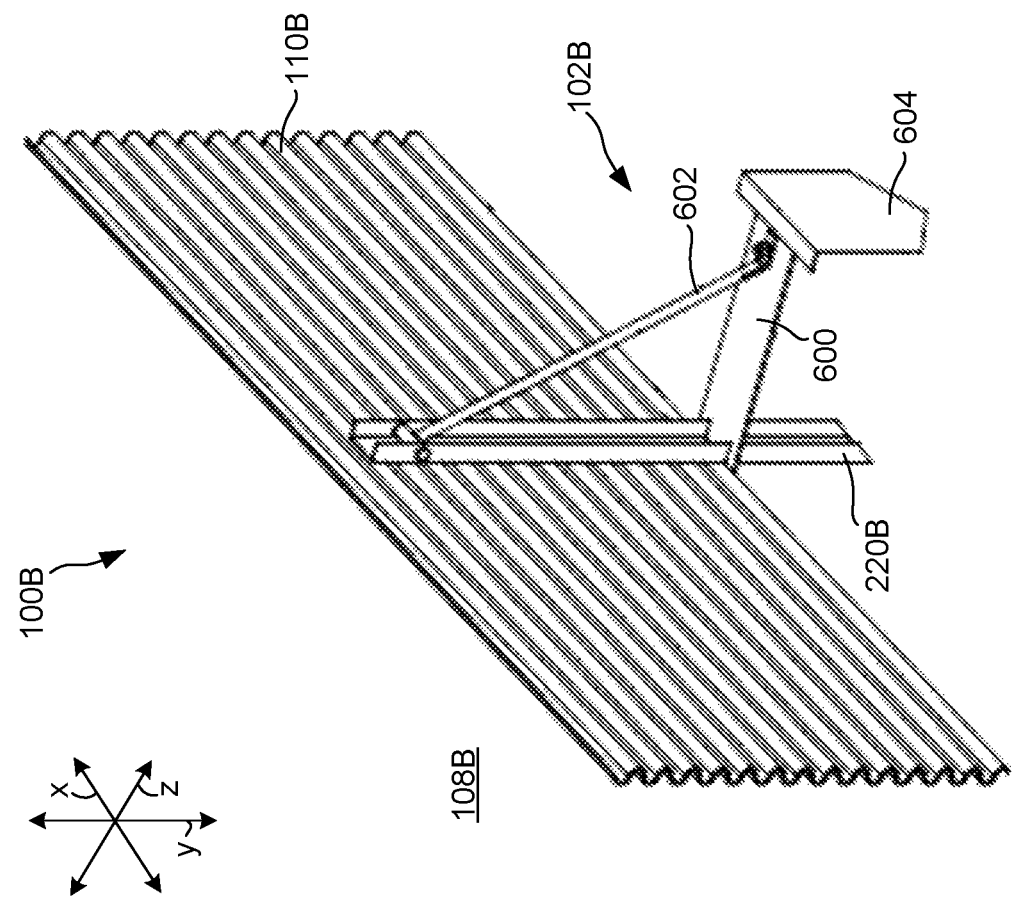

FIGS. 7A and 7B show the example support assembly 102B in the context of a secondary containment system 100B, with a panel 110B attached. FIG. 7A is a perspective drawing with the interior 108B of the secondary containment system on an opposite side of the panel 110B from the elongate post member 220B. FIG. 7B is a sectional drawing of the secondary containment system, also with the interior on the opposite side of the panel 110B from the elongate post member 220B. Referring to FIG. 7B, support assembly 102B can be embedded in the ground 230 such that the base plate generally rests on the ground surface 530 (e.g., flush with the ground). In the example of support assembly 102B, the panel 110B can rest on base plate 600.

In one implementation, support assembly 102B can be preassembled and driven into the ground as a unit. In other implementations, some or all of the elements of support assembly 102B could be assembled and installed in place, as illustrated in FIGS. 8A through 8D. For example, base plate 600 can be placed on the ground as shown in FIG. 8A. FIG. 8B shows elongate post member 220B driven into the ground through cutout 606 in the base plate. Shown in FIG. 8C, brace 602 can be attached to the elongate post member and the base plate. FIG. 8D shows stabilization plate 604 driven into the ground. Finally, panel 110B can be attached to the support assembly, as shown in FIGS. 7A and 7B. In another case, the support assemblies can be preassembled with the exception of the stabilization plate; the assembly can be driven into the ground and then the stabilization plate can be driven into the ground proximate to the base plate.

Design or dimensions of various implementations of the support assemblies can be influenced by many factors. For a secondary containment system to be able to contain a larger force or a force that is applied generally higher on the interior of the panels, the elongate post members and stabilization plates could be embedded deeper in the ground, support assemblies could be spaced more closely along the panels, or the support assemblies could be braced, as in example support assembly 102B shown in FIG. 6. In general, the use of stabilization plates on the support assemblies can allow the support assemblies to be placed farther apart along the panels than systems using traditional posts set in concrete footings. For example, support assemblies with lower and upper stabilization plates, such as support assemblies 102 (FIGS. 1-4) and 102A (FIG. 5), can be placed approximately ten feet apart and can provide similar support as traditional posts using concrete footings placed approximately four feet apart.

Some factors affecting the design of some elements of support assemblies can include soil stiffness or compaction at a work site, a desire for conservation of materials, a desired height of elongate post members, and/or a limit on the footprint of the secondary containment system, among others. There can be a limit to the depth some elements can be embedded in the ground, such as where pipes or other materials are located or suspected within the ground, or where a depth of prepared or compacted ground is limited at a work site. Design of some elements of support assemblies can be influenced by considerations for how the elements are embedded into the ground, such as a shape for entry to the ground or a shape for applying force to embed the elements in the ground.

Other configurations of support assemblies are contemplated. For example, if a smaller footprint were desired for secondary containment system 100 (FIG. 1), elongate post member 220 and panels 110 could be taller and contain a similar volume of material as a secondary containment system with a larger footprint. The example support assembly 102 shown in FIG. 4 could be modified to also include a brace similar to brace 602 in FIG. 6, but without a base plate such as base plate 600 shown in FIG. 6. In this case, the brace could allow the support assembly to support a taller elongate post member. In this case, upper stabilization plate 224 (FIG. 4) could be secured to the elongate post member 220, stabilization plate 604 (FIG. 6) could be on the end of the brace 602, or the support assembly could include both of these stabilization plates.

Support assemblies such as 102 (FIGS. 1-4), 102A (FIG. 5), and/or 102B (FIGS. 6-8D) could be used in other fields besides secondary containment systems. Other uses can include support for snow fences or highway guard rails. The support assemblies can generally be used to assist in countering a horizontal force.

Various details of splice assembly 104 will now be described in more detail. FIGS. 9A through 9C collectively relate to securing panels 110 of secondary containment system 100 to one another. As mentioned above, some implementations of the secondary containment system can include splice assemblies 104, which can consist of pairs of reinforcing members 204. The example illustrated in FIG. 9A shows reinforcing members 204(1) and 204(2), which are also evident in FIGS. 2 and 3, respectively. The reinforcing members 204 can have side members 900 with inwardly facing surfaces 902. In FIG. 9A, only one inwardly facing surface 902(1) is visible on reinforcing member 204(1) due to the perspective of the drawing, while two inwardly facing surfaces 902(2) and 902(3) are visible on reinforcing member 204(2). In some implementations, the splice assemblies 104 can include corrugation spacer and plug assemblies 904, shown in FIG. 9B. As illustrated in FIG. 9C, in this implementation a corrugation spacer and plug assembly 904(1) can include a bolt 906, a corrugation spacer 908, a plug 910, and a nut 912. In some implementations of the secondary containment system, a corrugation gasket 914 can be placed between the spliced panels 110.

As shown in the example in FIGS. 1-3, panels 110 of secondary containment system 100 can have a corrugation pattern. This pattern is best seen when viewed along an edge of a panel 110, as in FIG. 9B. FIG. 9B is a sectional view of example splice assembly 104(1) viewed along the x axis. In this example, panels 110(1) and 110(2) are spliced together, although they are designated together as 110 due to the scale of the drawing. (Individual panels 110(1) and 110(2) are evident in the closer view in FIG. 9C.) In FIG. 9B, the panels 110 extend into the drawing page along the x axis, and the corrugation pattern of the ends of the panels define a wave shape or a generally sinusoidal curve extending along the y axis of the x-y-z reference axes. FIG. 9C is a sectional view of example splice assembly 104(1) viewed along the y axis, or orthogonal to the view in FIG. 9B. Accordingly, in FIG. 9C the panels 110 appear flat, instead of having a wave shape.

In general, the corrugation pattern of multiple panels 110 can match such that the panels generally fit against one another at overlapping sections 114 (as shown in FIGS. 1-3), or nest with each other. Referring to the example shown in FIG. 9B, the inwardly facing surfaces 902 can have a corrugation pattern that matches the corrugation pattern of the panels 110. Accordingly, when the reinforcing members 204 are placed on overlapping panels 110, the inwardly facing surfaces can lie closely against the corrugated sides of the panels. Viewed another way, referring to FIG. 9A, the corrugation pattern of inwardly facing surface 902(1) can interlock with the corrugation pattern of inwardly facing surface 902(2) when reinforcing members 204(1) and 204(2) are brought together on opposing sides of the panels 110, as shown in FIG. 9B.

In some implementations, the panels 110 can be sheets of corrugated aluminum or other metal. The corrugation pattern can be any pattern or shape that can add strength to the panel, as opposed to a planar sheet of material that may be relatively more susceptible to bending or other failure when subjected to a force. For example, referring to FIG. 9B, the pattern can add strength to the panel 110 to be able to resist deformation of the panel when a force is applied to a broad side of the panel. Other patterns or shapes for the panels or panel edges are contemplated, such as zigzags, or irregular patterns or shapes. Accordingly, the reinforcing members 204 can conform to or otherwise match the shape of the panels.

The reinforcing members 204 can be made from various materials, such as iron based or aluminum based materials in the form of plate or bent plate, among others. For example, 10-gauge metal plate can be cut with a corrugation pattern on two opposing long sides, then formed (e.g., pressed) to resemble the channel shape of example reinforcing member 204(2) shown in FIG. 9A. The channel shape can add rigidity to the reinforcing member. Alternatively, channel or square tube steel could be cut lengthwise with a corrugation pattern to achieve a similar configuration. Other materials or configurations for reinforcing members are contemplated. The example reinforcing members 204 shown in FIGS. 9A and 9B have two side members 900 and two inwardly facing surfaces 902. In other implementations, the reinforcing members could have more or less side members or inwardly facing surfaces. For example, the reinforcing member could be made from a long strip of plate metal formed or pressed in a corrugated shape (e.g., wave shape) or made from a solid material cut lengthwise with a corrugation pattern, such that there are no side members and only one inwardly facing surface (not shown).

As shown in the example in FIG. 9B, splice assembly 104(1) can extend vertically along the overlapping panels 110 (e.g., along the y axis), but the length of the splice assemblies can be less than a height of the overlapping panels (not designated). In other words, top and bottom portions of panels 110 may extend beyond the reinforcing members 204 in the y direction. In the example shown in FIG. 9B, the length of the reinforcing members 204 in the y direction is about two-feet, seven-inches, whereas the panels 110 as measured in the y-direction are approximately three-feet. In the example shown in FIG. 9C, gasket 914 is evident between overlapping panels 110(1) and 110(2). The gasket can be made from plastic or a putty type material, among others, and the material can conform to the corrugation pattern. In some implementations, the gasket can generally extend along the entire height of the overlapping panels (not shown). Additionally, as shown in FIG. 9C, the gasket can extend through the splice assembly in the x direction beyond outer edges 916 of the inwardly facing surfaces 902 of the reinforcing members. In this case, even though the splice assembly may not extend along the entire height of the overlapping panels, the splice assembly can apply enough force to the overlapping panels and gasket to effectively seal the entire height of overlapping panels 110.

As mentioned above, FIG. 9C is a sectional, closer view of example splice assembly 104(1), viewed along the y axis. In some implementations, corrugation spacer and plug assemblies 904 can be oriented so a head 918 of bolt 906, corrugation spacer 908, and plug 910 are on the interior 108 side of panel 110(2), and therefore on the interior 108 side of secondary containment system 100 (shown in FIG. 1), to assist with the fluid-tight seal of splice assemblies 104. As shown in the example in FIG. 9C, the channel shape (e.g., C-shape) of reinforcing member 204(2) can create an inner cavity 920 of the reinforcing member and the panel 110(2). In some implementations, the corrugation spacer 908 and the plug 910 can be mounted on the bolt 906 and fill the inner cavity 920, between an interior wall 922 of reinforcing member 204(2) and a surface 923 of the panel 110(2), helping to form a fluid-tight seal. The corrugation spacer 908 can be positioned against the interior wall 922 and the plug can be positioned against the panel 110(2). In this case, the plug can fit partially into a bolt hole 924 in overlapping panels 110(1), 110(2) and gasket 914.

FIGS. 9A through 9C are not drawn to scale, and proportions of elements shown in the Figures are not meant to be limiting. In particular, note that the length of corrugation spacer 908 can vary depending on the location of the corrugation spacer and plug assembly 904 relative to the corrugation pattern. For example, as shown in FIG. 9B, due to the positioning of corrugation spacer and plug assemblies 904(1) and 904(2) relative to the corrugation pattern of panels 110, corrugation spacer and plug assemblies 904(1) and 904(2) will utilize corrugation spacers 908 with different lengths relative to the z axis. Viewed another way, corrugation spacer and plug assemblies 904 extend from interior walls 922 of reinforcing members 204 along the z axis to points (not designated) in line with the wave shape of panels 110. In some implementations, the placement of the corrugation spacer and plug assemblies 904 along a given reinforcing member 204 can be such that the corrugation spacers 908 are the same length, or different lengths.

Traditional techniques for combining panels utilize a relatively large number of bolts, such as 26 bolts per splice. In general, the bolts are needed to seal the gasket between panels, providing a water-tight barrier. The inventive concepts allow a greatly reduced number of bolts to be utilized to splice two containment panels 110 together. Further, since each bolt/bolt hole is a breach of gasket 914, fewer bolts and bolt holes can increase the relative reliability of secondary containment system 100. As shown in FIG. 9B, 26 bolts can be replaced by four corrugation spacer and plug assemblies 904 in equivalent splices. Of course, other implementations can use less than four or more than four corrugation spacer and plug assemblies or bolts 906. In any case, the number of bolts can be greatly reduced from traditional configurations for a given splice, saving material and installation time. Additionally, the channel shape of the reinforcing members 204 shown in FIGS. 9A and 9C can provide greater rigidity than when the larger number of bolts, such as 26, is used. In other implementations, alternative methods of securing reinforcing members 204 on either side of overlapping panels 110 or sealing elements of splice assemblies 104 are contemplated.

In some implementations, splice assembly 104 can enable lifting devices to be incorporated (not shown). For instance, a lifting hook or loop could be added, such as via welding to the top of one or both reinforcing members 204 of a pair. Alternatively, one or both of the reinforcing members of the splice assembly could be taller than a panel 110 so that the reinforcing member(s) extend above the panel. A hole drilled through this extension could be utilized to lift sections of secondary containment system 100. In this manner, elements of barrier structure 106 (FIG. 1) could be pre-built or pre-assembled into longer sections to reduce time spent in the field.

In some implementations, panels 110 with the corrugation pattern may be generally planar overall, as shown in FIG. 1. In other implementations, corrugated panels can have an overall curved form such that secondary containment system 100 can be a round or oval shape (not shown). Other shapes for the secondary containment system are contemplated, and can be assembled with corrugated panels that are planar, curved, bent, or have other configurations. Referring to FIG. 1, implementations of secondary containment system 100 that include corners can have corner sections 112. The corner section 112 can include the corrugation pattern and can overlap the panels 110. In this implementation, the corner section and a panel can be secured together with the splice assemblies. This example is not meant to be limiting; other structures for corners of secondary containment systems are contemplated.

FIG. 1 depicts splice assemblies 104 mounted vertical with respect to the corrugation pattern of panels 110. In other implementations, the splice assemblies could be mounted at a different angle or orientation, such that inwardly facing surfaces of reinforcing members 204 would have a different shape or pattern dictated by the orientation.

Splice assemblies 104 could be used in other fields that employ splicing of corrugated or other patterned materials. For example, grain elevators, culverts, or other structures could be assembled with splice assemblies to secure overlapping panels tightly.

CONCLUSION

Although techniques, methods, devices, systems, etc. pertaining to secondary containment systems are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A panel splice assembly comprising:
   first and second overlapping barrier panels, the barrier panels having a corrugation pattern, the corrugation pattern approximating a sinusoidal curve; and
   elongate reinforcing members configured to be positioned as a pair on opposing sides of the first and second overlapping barrier panels and secured together, the elongate reinforcing members including inwardly facing surfaces configured to match the corrugation pattern of the first and second overlapping barrier panels.

2. The panel splice assembly of claim 1, further comprising a corrugation gasket between the first and second overlapping barrier panels, such that when the elongate reinforcing members are secured together on opposing sides of the first and second overlapping barrier panels the panel splice assembly forms a generally water-tight barrier.

3. The panel splice assembly of claim 1, wherein the elongate reinforcing members include side members that define:
the inwardly facing surfaces; and
inner cavities of the elongate reinforcing members.

4. The panel splice assembly of claim 3, further comprising multiple corrugation spacer and plug assemblies mounted in an individual inner cavity of one elongate reinforcing member of the pair, the corrugation spacer and plug assemblies having spacer ends proximate an interior wall of the inner cavity opposite an individual barrier panel and plug ends proximate the individual barrier panel, wherein a length of an individual corrugation spacer and plug assembly is dependent on a shape of the sinusoidal curve where the individual corrugation spacer and plug assembly is mounted on the one elongate reinforcing member.

5. A secondary containment system comprising:
a barrier structure including multiple overlapping panels, individual panels having a corrugation pattern;
multiple support assemblies, individual support assemblies including:
a lower stabilization plate mounted proximate to a bottom end of a first side of an elongate post member facing an interior of the secondary containment system, and
an upper stabilization plate mounted on a second opposite side of the elongate post member in a lower portion of the elongate post member,
wherein the lower portion of the multiple support assemblies are configured to be embedded in the ground such that a top edge of a generally vertical portion of the upper stabilization plate is flush with the ground; and
multiple pairs of reinforcing members, individual reinforcing members of the multiple pairs positioned on opposing sides of overlap areas of the multiple overlapping panels and secured together, the individual reinforcing members including inwardly facing corrugated surfaces that match the corrugation pattern of the individual panels,
wherein the individual panels are secured against the individual support assemblies on an interior side of the secondary containment system.

6. The secondary containment system of claim 5, wherein the upper stabilization plate further includes:
a generally horizontal portion that extends from the top edge of the generally vertical portion of the upper stabilization plate on either side of the elongate post member toward the interior of the secondary containment system,
wherein the generally horizontal portion is configured to support at least one of the individual panels mounted on the first side of the elongate post member.

7. A panel splice assembly comprising:
first and second overlapping barrier panels, the barrier panels having a corrugation pattern; and,
a pair of elongate reinforcing members configured to be positioned on opposing sides of the first and second overlapping barrier panels and secured together, the elongate reinforcing members including inwardly facing surfaces configured to match the corrugation pattern of the first and second overlapping barrier panels.

8. The panel splice assembly of claim 7, further comprising a corrugation gasket between the first and second overlapping barrier panels, such that when the elongate reinforcing members are secured together on opposing sides of the first and second overlapping barrier panels the panel splice assembly forms a generally water-tight barrier.

9. The panel splice assembly of claim 7, wherein the elongate reinforcing members include side members that define:
the inwardly facing surfaces; and
inner cavities of the elongate reinforcing members.

10. The panel splice assembly of claim 9, further comprising multiple corrugation spacer and plug assemblies mounted in an individual inner cavity of one elongate reinforcing member of the pair, the corrugation spacer and plug assemblies having spacer ends proximate an interior wall of the inner cavity opposite an individual barrier panel and plug ends proximate to the individual barrier panel, wherein a length of an individual corrugation spacer and plug assembly is dependent on a shape of the corrugation pattern where the individual corrugation spacer and plug assembly is mounted on the one elongate reinforcing member.

11. A method comprising:
overlapping portions of first and second barrier panels, the barrier panels having a corrugation pattern; and,
securing the overlapping portions with a pair of elongate reinforcing members positioned on opposing sides of the first and second overlapping barrier panels, the elongate reinforcing members including inwardly facing surfaces configured to match the corrugation pattern of the first and second overlapping barrier panels.

* * * * *